United States Patent [19]
Dailey

[11] 3,989,430
[45] Nov. 2, 1976

[54] TIRE MOLD HAVING NAILS INSERTED IN THE VENTS

[75] Inventor: Charles R. Dailey, Cuyahoga Falls, Ohio

[73] Assignee: The General Tire & Rubber Company, Akron, Ohio

[22] Filed: Feb. 12, 1976

[21] Appl. No.: 657,416

[52] U.S. Cl. .............................. 425/28 R; 425/812; 249/141
[51] Int. Cl.² .......................................... B29H 5/02
[58] Field of Search ................ 425/28 R, 28 D, 401, 425/812; 249/141, 187 R

[56] References Cited
UNITED STATES PATENTS

| | | |
|---|---|---|
| 2,524,737 | 10/1950 | Sawyer ............................ 249/141 X |
| 3,151,374 | 10/1964 | Kersten ............................ 249/187 R |
| 3,344,477 | 10/1967 | Stokis ................................... 425/812 |
| 3,374,983 | 3/1968 | Garretson et al. ................... 425/812 |
| 3,377,662 | 4/1968 | Fukushima............................ 425/812 |
| 3,804,566 | 4/1974 | Kimura et al. ....................... 425/812 |
| 3,854,852 | 12/1974 | Carter.................................. 425/812 |
| 3,891,363 | 6/1975 | Sievers................................. 425/812 |

FOREIGN PATENTS OR APPLICATIONS 1,394,552 2/1965 France ................................ 249/141

*Primary Examiner*—J. Howard Flint, Jr.

[57] ABSTRACT

Nails are inserted into the vents of tire molds. The nails prevent rubber protrusion from forming in the vents during molding.

6 Claims, 12 Drawing Figures

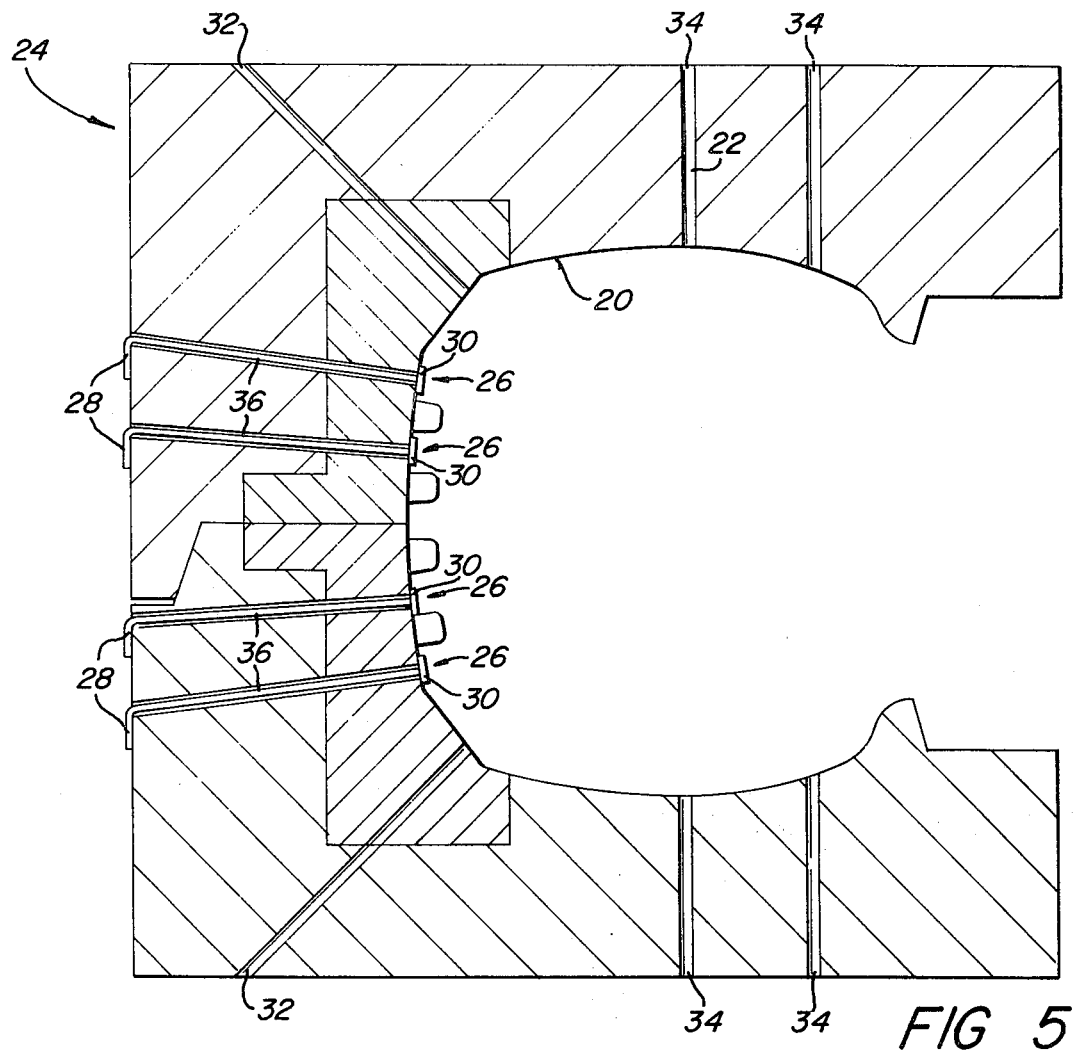
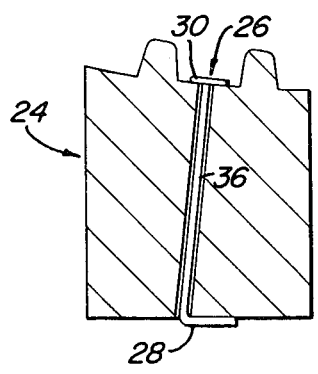
FIG. 6
FIG 7
FIG. 9

TIRE MOLD HAVING NAILS INSERTED IN THE VENTS

BACKGROUND OF THE INVENTION

This invention relates to nail like inserts in the air vents of tire molds.

Two basic types of tires are presently being built. Bias ply tires, the first type, are built as cylinders on tire building drums. The cylinders are placed in molds. A bladder positioned inside of the cylinder is inflated with steam to convert the cylinder to toroidal shape, force the uncured rubber of the outer surface of the tire into the mold configuration and cure the tire. The procedure employed for molding a radial tire is much the same except that the uncured tire is in the shape of a toroid having a diameter almost as large as the inner surface of the mold prior to insertion into the mold. After curing it is very difficult to remove a radial tire from a conventional two piece mold because the outer diameter of the radial tire is larger than the inner diameter, formed by the surface protrusion, of the mold. By a two piece mold is meant one having two pieces against which the outer surface of the tire is formed. A bladder expands the tire into the mold surface. A tire is normally molded lying in a horizontal plane.

The upper mold surface is lubricated with silicone to facilitate release. To remove the tire from the mold a radial tire is forced from the bottom half of the mold with considerable pressure. The radial tire releases suddenly. When the tire breaks loose some of the rubber protrusions formed in the air vents break from the tire and collect in the bottom half of the mold. The broken off rubber protrusions are hereinafter referred to as plugs. Attempts to remove the plugs with pressurized air have been effective in 90% of the cases on one line of radial tires resulting in 10% of the tires produced of that line containing cosmetic surface defects caused by plugs lying in the bottom half of the mold being molded into the sidewall of the next tire cured in the mold.

The prior art does not appear to recognize the problem of rubber plugs breaking off of tires and being molded into the sidewalls of subsequently formed tires.

Even if the plugs formed in the mold vents do not break off, they are undesirable both in bias and radial tires. The plugs that do not break off the tire are usually removed by hand using knives. This is a waste of rubber and often results in the tires being cut in the wrong places by the knives. This trimming can result in the tire being thrown out of balance.

The trimming of the plugs from tires requires a large amount of hand labor. When dealing with rapidly spinning small tires such as a truck or automobile tire, there is the danger of the rotating tire suddenly taking on a forward motion and striking the trimmer. With a large tire such as a farm implement tire or a giant earth mover tire there is the problem of physically moving the tire for the trimmer to remove the plugs and the problem of the large tire striking the trimmer when the tire is moved and/or rotated. When tires are manufactured in segmented molds there is also the problem of the rubber plugs, formed in the vents, breaking off and getting in the complex mechanical mold mechanism. This could cause mechanical wear or early failure of the segmented mold mechanism.

British Pat. No. 922,788 discloses the use of a valve to eliminate spew or plugs so as to eliminate a subsequent finishing operation.

Other patents such as U.S. Pat. Nos. 3,822,857 and 3,804,566 show the use of small openings in the vents apparently to allow air to pass but little if no rubber.

SUMMARY OF THE INVENTION

It has been unexpectedly discovered that by inserting nails into the air vents of radial tire molds and fixing the nails in place, that the number of radial tires having surface defects due to plugs being molded into the tire surfaces was reduced to 0%. Other advantages included the elimination of the plug protrusion from tires, and the expense of removing the protrusions. The rubber normally wasted in forming the protrusions goes into the tire body. The tires without the protrusions are easier to remove from a mold. In addition when the tire mold is cleaned having the nails in place, the vent holes do not plug up with the sand, grit or glass beads used to clean the mold. The nails would be replaced after mold cleaning in the event the air passages under the nail heads were blocked. If no blockage occurs the nails are left in place.

Although the present invention solves a serious problem encountered in the manufacture of radial tires, it is also quite useful in the manufacture of bias tires. The elimination of rubber plugs from the surfaces of all tires saves rubber, eliminates the trimming operation and the recited prior art problems associated with trimming. The present invention also eliminates the problem of rubber plugs formed in vents from breaking off and damaging the mechanism of segmented molds.

BRIEF DESCRIPTION OF THE DRAWINGS

FIG. 5 is a cross-sectional view of a tire mold having flat headed nails inserted into the tread vents of a tire mold. The nails are held in place by bending the shanks against the exterior mold surface.

FIG. 6 is a cross-sectional view of one of the vents of the mold of FIG. 5 showing a nail in place.

FIG. 7 is a view of one of the nails of FIG. 5 prior to inserting into a vent.

FIG. 9 is a view of a circular recess of FIG. 8.

DESCRIPTION OF THE PREFERRED EMBODIMENTS

Figure 1:
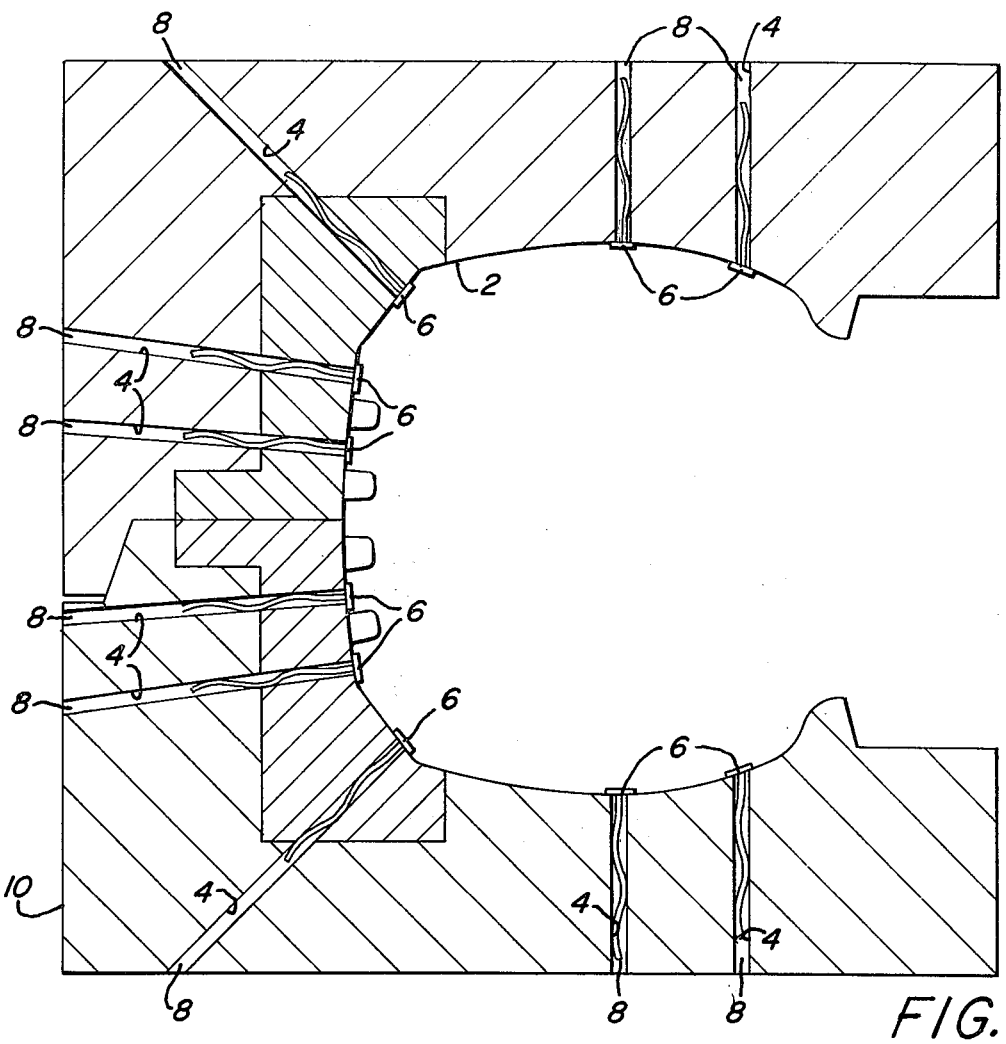
FIG. 1 is a side cross-sectional view of a tire mold having flat-headed nails inserted in the vents. The nails are crimped.

Each nail insert of the tire vents is preferably a flat-headed nail having protrusions of from 0.025 to 0.125 mm under the nail head. These protrusions are inherent in the manufacture of nails. When the nails are in place in the mold the protrusions hold the under surface of the nail head far enough away from the mold surface to allow air, but not rubber to pass under the nail head and exhaust. The nail in one embodiment is held in place by bending the shank of the nail protruding from the outer surface of the mold. The nail can also be held in place by enlarging the portion of the shank extending from the outer surface of the mold by known procedures such as by securing a disk to the shank or flattening the shank. The shank of the nail can also be bent and wedged into the vent holes. The preferred method of holding the nail in place is by inserting the shank through the vent until the nail head strikes the inner surface of the mold, then bending the shank against the outer surface of the mold to hold the nail in place. This preferred method allows some play of the shank in the vent. It is estimated that the head of the nail can move from 0.025 mm to 0.125 mm in relation to the inner surface of the mold.

In some instances the inner surface of the mold, such as the sidewall comes into direct contact with a support member and there is no space between the outer mold surface and the contact member to accommodate the bent over nail shanks. To accommodate bent over nail shanks in such a situation individual, preferably circular, recesses are cut into the back face of the mold. Each recess accommodates one bent over nail shank (See FIGS. 8 and 9). Larger areas including the entire back face of the mold behind one sidewall can be recessed except for support areas to accommodate the shanks of all the nails used for the entire sidewall.

Instead of a circular recess in the back surface of the mold to receive the bent over shank, a groove can be cut into the surface to receive the shank. (See FIGS. 8 and 10).

The cutting of a groove is particularly useful when a nail having a head designed to fit a particular mold surface design is employed. Bending the nail shank into the grooved recess will prevent the nail head having a specific non-round configuration from turning with respect to the corresponding mold surface configuration. (See FIG. 11 for a non-round nail head, a mold surface configuration corresponding to the nail head configuration is not shown.)

The cutting of a groove into the exterior mold surface is also useful if the exterior and interior mold surfaces are not parallel. If the inner mold surface is at a nonparallel angle with the exterior surface, the nail head is struck with a hammer to bend it so that it lies flat and parallel with the inner mold surface (See FIGS. 1 and 8.)

The preferred nail is shown at FIG. 7. It is an aluminum nail having a head 30 and a shank 36 without a point. The aluminum nail is preferred because it has a smooth surface which prevents the air passage under the head from blocking as fast as a steel nail.

Figure 11:
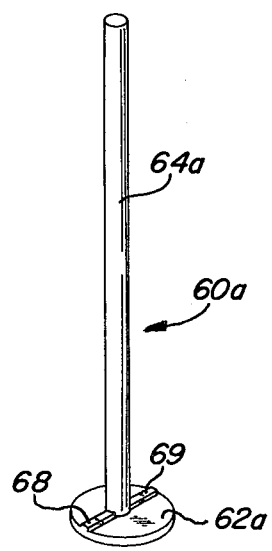
FIG. 11 is a view of a nail having radial ridges.

A modification of the preferred nail is shown at FIG. 11. This nail has radial ridges 62 and 64 under the head. The nail including the shank 68 is made of aluminum.

Figure 3:
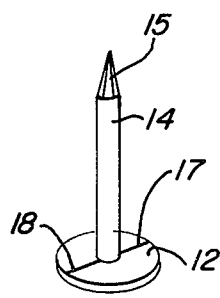
FIG. 3 is a view of a conventional nail.

A conventional steel wire or box nail as shown in FIG. 3 can also be used as an insert in a tire mold vent. The nail has a shank 14 a point 15 and a head 12. On the under side of the head are die marks 17 and 18.

Figure 4:
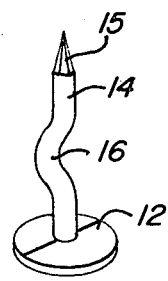
FIG. 4 is a view of the nail of FIG. 3 after it has been crimped.

The steel box nail before insertion into the vent is crimped as is shown in FIG. 4. The nail of FIG. 4 has a shank 14 having a crimp 16. The crimp is such that the nail will not fit loosely in a vent hole. It must be driven in. There is sufficient springiness in the crimped shank 14, 16 to hold the nail in place.

Figure 12:
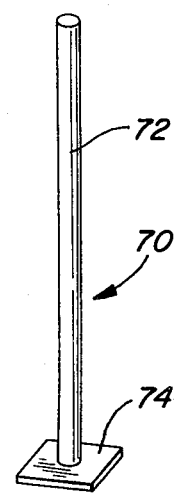
FIG. 12 is a view of a square headed nail.

The nail of FIG. 12 is exemplary of nails having head surface configurations to match tread surface configurations of a tire mold. The nail has a square head 74 and a shank 72.

In order that rubber from the tire being molded not adhere to the nail, it is recommended that the nail be coated with a release agent such as polyfluoroethylene.

A tire mold often contains between 200 and 2000 vents. If it can be established that only plugs from certain vents are creating a problem, then nails can be inserted only in the problem vents. Sidewall vents generally do not cause a problem. It is preferred, however, that all vents have nails inserted in them.

It is preferred that the nail inserts have flat heads having a diameter of from .5 mm to 1.7 mm larger than the diameter of the shank. The shank has a diameter of about .2 mm to .7 mm smaller than the vent in which it is placed. For example the vent holes generally range from a diameter of 1.2 mm to 2.2 mm in diameter. The nail shanks generally have a diameter of .9 mm to 1.7 mm. These values do not appear to be critical. The length of the shank also is not critical. The shank preferably is long enough that it can be inserted through the vent hole then the headless end bent over against the outer mold surface to lock the insert in the vent hole. Imperfection in the nail causes a clearance of about .02 to .13 mm between the head of the nail and the mold surface. For this application a nail having a shank of up to 20.3 cm or so can be used.

If the shank of the nail is bent over to hold the nail in place, there still remains in most cases some slight movement of the shank along the length of the vent. This movement can be as much as 0.125 mm and can vary down to zero. The amount of movement does not appear to be critical. If the nail is to be bent and driven into the vent hole, a shank length of from 12.7 mm to 50.8 mm is sufficient. A nail having a shank of from 14 to 20 cm is preferred. The nails used in Example I were of a commercial grade and had surface imperfections under the nail heads which held the nail heads away from the mold surface allowing air to discharge. By using the nail system a relatively large air discharge area can be provided while still retaining an opening having one small dimension. That is to say there is a lot of room around the circumference of the nail head for air to exhaust but the space between the nail head and the mold surface is so small that uncured rubber cannot enter the spaces.

EXAMPLE I

This example involves one conventional tire mold used commercially to manufacture a size GR-78-14 radial tire. In the normal operation of the mold, about 10% of the tires produced had molded in plugs. The vents of the tire mold were conventional open vents. There are approximately 1000 vents in this mold. The vents have a 1.78 mm diameter, and range in depth from 2.5 cm to 10 cm. A cross section of the mold is shown in the drawing FIG. 1. The inner mold surface is shown at 2 and the metal inner surface of the vents at 4.

Figure 2:
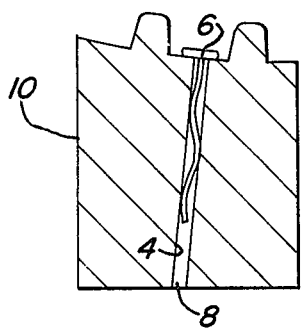
FIG. 2 is an enlarged cross-sectional view of a section of the tire mold of FIG. 1 showing a flat-headed nail inserted in one of the vents and held in place by the pressure exerted by a crimp in the nail against the interior surface of the vent.

The mold was modified, according to the present invention, by inserting crimped nails 6 in each of the vents 8 of mold 10 (See FIG. 1). A typical vent 8 having a crimped nail insert 6 is shown in FIG. 2. The nails used were common wire nails otherwise known as box nails. Such a nail before crimping is shown in FIG. 3. The head 12 is attached to pointed shank 14. The nails used had a shank length of 18 cm, a shank diameter of 1.5 mm and a head diameter of 3.6 mm. The head 12 was flat and had a thickness of 0.36 mm. The nails were made from steel. Before inserting the nails into the vents the nails were crimped. As shown in FIG. 4, shank 14 contains crimp 16. The crimped nail 6 does not slide easily into vent 8 and must be driven in. Once in the springing action of crimp 16 holds nail 6 in place.

The mold 10 was operated in the production of tires for a limited period to determine the feasibility of the system. Some venting problems and some vent blockage problems developed after several days of use. The formation of rubber plugs in the vent holes was eliminated along with all of the problems created by the plugs. The experiment of this example showed the idea of nails in the vents had potential.

EXAMPLE II

After the results of Example I were obtained the nails were redesigned to overcome the vent blocking problem. The new nails were made from aluminum which had a smoother finish than the steel nails and thus less likely to hold accumulated particles. More vent holes were added to the mold to overcome the incomplete venting problem of Example I.

This example involves one conventional tire mold used commercially to manufacture a size LR 78-15 radial tire. In the normal operation of the mold, about 8% to 10% of the tires produced had plugs molded into the sidewalls. In normal operation the vents were conventional open vents. There are approximately 1000 vents in this mold in its conventional state. The vents have a 1.78 mm hole diameter, and range in depth from 2.5 cm to 10 cm. The mold was of the type shown in the drawing FIG. 5. The inner mold surface is shown at 20 and the metal surface of the vents at 22. The mold 24 has approximately 300 additional vent holes drilled into it making a total of 1300 total vent holes. The holes are drilled in the center of each mold cavity which forms a tread protrusion.

The mold 24 was modified, according to the present invention, by inserting nails 26 in each of the approximately 950 tread vents, and bending the shanks 28 of the nails against the back side of the mold surface to lock the nails in place. The nail heads 30 lie flat against the inner mold surface 20. A typical vent having a nail insert is shown in FIG. 6. The nail before it is inserted and before it has its shank bent is shown in FIG. 7. Nails were not inserted into the shoulder vents 32 and the sidewall vents 34 because these vents did not result a serious problem of rubber plugs being molded into the sidewalls. The nails used had a length of 15.2 cm, a shank 36 diameter of 1.5 mm and a head 30 diameter of 3.6 mm. The head 30 was flat and had a thickness of 0.36 mm. The nails were made from aluminum. Unlike ordinary nails they had no point.

The mold was operated in the regular production of tires for one month, twenty four hours per day, 5 days a week, with no major plugging or other problems. The mold was then cleaned without removing the nails and put back into service. A mold is normally cleaned at about one month service intervals. None of the tires produced had rubber plugs molded into the sidewalls.

EXAMPLE III

Figure 8:
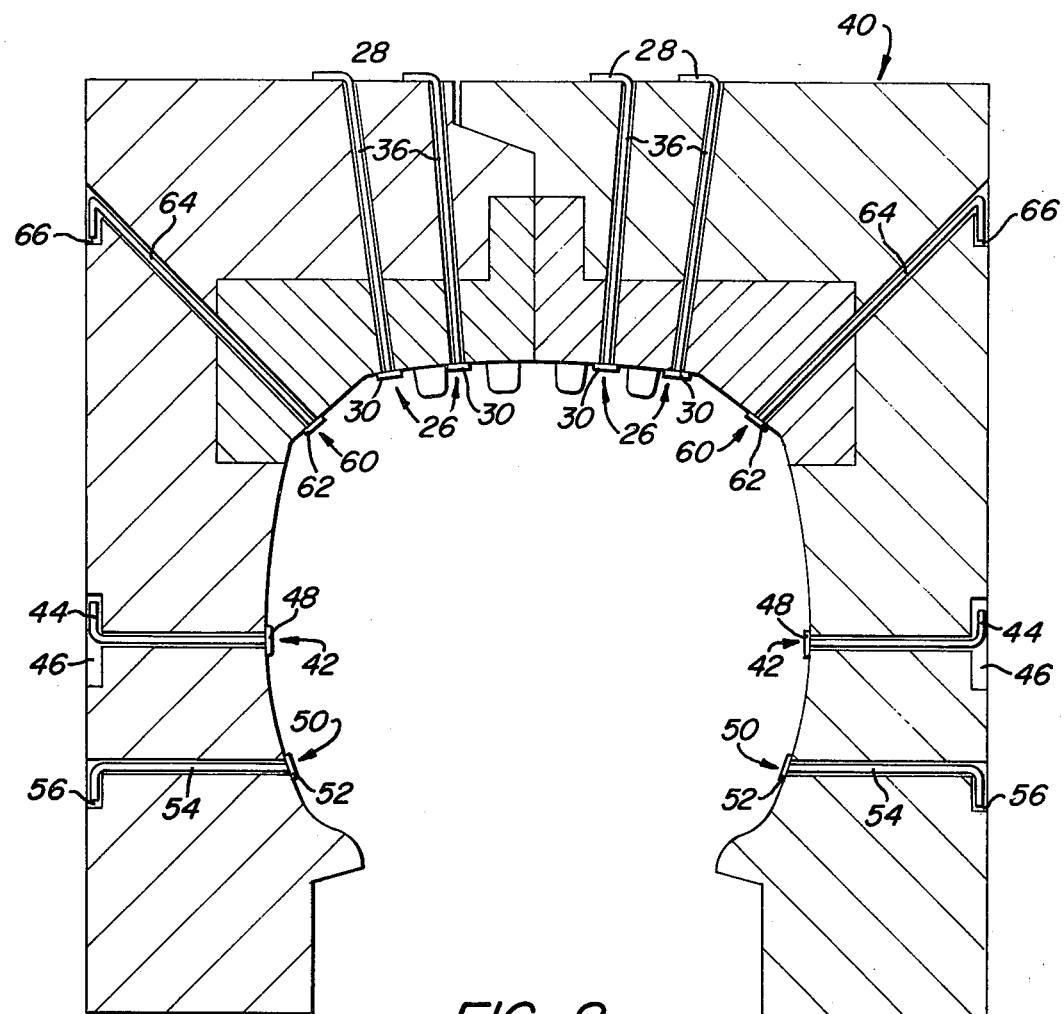
FIG. 8 is a cross-sectional view of a tire mold like that of FIG. 5 having nail inserts in shoulder and sidewall vents, and having recesses cut into the exterior mold sides so that the bent over nail shank will not protrude beyond the original mold surface.

In order to eliminate rubber protrusions from forming on sidewalls and shoulders of tires, the mold of FIG. 5 was redesigned to accommodate nails in both the shoulder vents and the sidewall vents. The redesigned mold is shown in FIG. 8. Insofar as the rib vents and nail inserts for the rib vents are concerned, they are the same as those of FIG. 5. The mold however is modified with respect to the sidewall vents and the shoulder vents. If the nails were inserted into the shoulder and sidewall vents of the mold of FIG. 5 and bent over against the outer surface of the mold, the protrusions would interfere with placing the mold in a press. To overcome this problem, the side surfaces of the mold are recessed to accommodate the bent over shanks of the nails.

In the case of the sidewall vents where the nail heads lie normally flat against the inner surface of the mold, the outer surface surrounding each of the mold vents is recessed in a circular manner to accommodate the bent over nail end. This feature is shown by nail 42 inserted through the sidewall of mold 40. Shank 44 is bent over into a circular recess 46 of the outer wall of mold 40. Head 48, perpendicular to shank 44 lines flat against the inner surface of mold 40. The circular recess is shown in a side view of the section of the mold containing the recess in FIG. 9. The recess is shown at 46 and the bent over nail shank at 44. The position of the nail head at the inner surface of the mold is indicated at 48.

When the nail is inserted through the sidewall of the mold and the shank bent so that the head is parallel to the inner mold wall, it is preferred that the shank be bent over into a linear recess. This prevents rotation of the shank and the resultant nonparallel positioning of the nail head with the inner wall of the mold. Such a nail insert is nail 50. Head 52 is hit with a hammer so that it will lie parallel to the inner surface of the mold. Shank 54 is bent over into linear recess 56.

Figure 10:
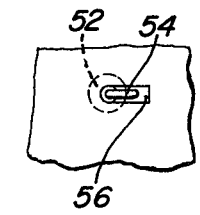
FIG. 10 is a view of a linear recess of FIG. 8.

A view of the part of mold 40 containing recess 56 is shown at FIG. 10.

Another situation in which it is preferred that the shank of the nail be bent over into a linear recess rather than a circular recess is where the vent hole is not perpendicular to the outer mold wall. This embodiment is shown in the shoulder vents. There nail 60 having head 62 parallel to the inner surface of the mold has its shank 64 bent over into linear recess 66. A side view of the section of the mold showing the linear recess is the same as FIG. 9.

Other embodiments which can be used include the nail of FIG. 11. The nail 60 of FIG. 10 has radial ridges 62 and 64 under nail head 66. These ridges are designed to space the nail head a distance of from 0.025 to 0.125 mm from the inner surface of the mold when shank is inserted into a mold vent and bent over to hold the nail in place.

When the head of the nail insert must conform to the configuration of the inner surface of the mold, a nail with a square or other conforming shaped head is employed. Such a nail is shown in FIG. 12. There nail 70 has shank 72 and square head 74. Preferably when this type of nail is used a linear recess is used in the outside surface of the mold so that the head will not move out of conformity with the mold configuration which it is supposed to mate.

What is claimed is:

1. A tire mold for imparting a tread design into the surface of a tire while the tire is being cured, said tire mold having vents for the purpose of releasing air which would otherwise be trapped as the uncured rubber is forced into the tread design section of the mold, the improvement which comprises a nail having a head and a shank inserted within at least some of the mold vents, the head of each nail being inside the mold cavity and the shank of the nail extending into the vent, and each nail being secured into place so that each shank is movable along the length of the vent from zero to 0.125 mm.

2. The mold of claim 1 wherein the nails are held in place by a bend in the shank.

3. The mold of claim 2 wherein the nails are held in place by a bend in the shank at the mold exterior.

4. The mold of claim 2 wherein the nails are held in place by a bend in the shank at the area of the nail positioned within the vent.

5. The mold of claim 1 wherein the nail contains a protrusion under the nail head which holds the nail away from the interior mold surface.

6. The mold of claim 5 wherein the protrusion is from 0.025 to 0.125 mm in height.

* * * * *